United States Patent
Nishimura

(10) Patent No.: US 12,218,627 B2
(45) Date of Patent: Feb. 4, 2025

(54) SOLAR PANEL CLEANING SYSTEM AND CLEANING PATH GENERATION DEVICE

(71) Applicant: IHI Corporation, Tokyo (JP)

(72) Inventor: Kenji Nishimura, Tokyo (JP)

(73) Assignee: IHI Corporation, Tokyo (JP)

( * ) Notice: Subject to any disclaimer, the term of this patent is extended or adjusted under 35 U.S.C. 154(b) by 296 days.

(21) Appl. No.: 17/734,326

(22) Filed: May 2, 2022

(65) Prior Publication Data

US 2022/0368280 A1    Nov. 17, 2022

(30) Foreign Application Priority Data

May 14, 2021   (JP) .................. 2021-082559

(51) Int. Cl.
| | |
|---|---|
| *H02S 40/10* | (2014.01) |
| *B08B 1/30* | (2024.01) |
| *B08B 3/02* | (2006.01) |
| *B08B 13/00* | (2006.01) |
| *G05D 1/00* | (2006.01) |
| *H02J 7/35* | (2006.01) |
| *B08B 1/12* | (2024.01) |

(52) U.S. Cl.
CPC ............... *H02S 40/10* (2014.12); *B08B 1/30* (2024.01); *B08B 3/024* (2013.01); *B08B 13/00* (2013.01); *G05D 1/0088* (2013.01); *H02J 7/35* (2013.01); *B08B 1/12* (2024.01)

(58) Field of Classification Search
CPC . H02S 40/10; H02S 40/12; B08B 1/30; B08B 3/024; B08B 13/00; B08B 1/12; G05D 1/0088; G05D 1/0274; H02J 7/35; H02J 7/342; H02J 50/10
See application file for complete search history.

(56) References Cited

U.S. PATENT DOCUMENTS

| | | | |
|---|---|---|---|
| 4,777,416 A | 10/1988 | George, II et al. | |
| 5,613,261 A | 3/1997 | Kawakami et al. | |
| 5,892,350 A | 4/1999 | Yoshikawa | |
| 2011/0137458 A1* | 6/2011 | Hisatani ................. | B08B 3/024 |
| | | | 901/1 |

(Continued)

FOREIGN PATENT DOCUMENTS

| | | |
|---|---|---|
| CN | 109560766 A | 4/2019 |
| CN | 111065306 A | 4/2020 |

(Continued)

OTHER PUBLICATIONS

Changsheng Jiang, "Solar panel cleaning robot" (ip.com machine translation of JP 2019-500063A), Jan. 10, 2019, ip.com machine translation (Year: 2019).*

(Continued)

*Primary Examiner* — Christopher W Carter
(74) *Attorney, Agent, or Firm* — Volpe Koenig

(57) ABSTRACT

A solar panel cleaning system includes a detection traveling vehicle configured to travel on a solar panel and detect dirt on the solar panel, a map generation part configured to generate a dirt map including a dirt position of the dirt on the solar panel, a cleaning path generation part configured to generate a cleaning path for performing cleaning of the solar panel, and a cleaning traveling vehicle configured to travel on the solar panel on the basis of the generated cleaning path and perform cleaning of the solar panel.

4 Claims, 6 Drawing Sheets

(56) References Cited

U.S. PATENT DOCUMENTS

| | | | |
|---|---|---|---|
| 2012/0247510 A1 | 10/2012 | Chen et al. | |
| 2019/0056744 A1* | 2/2019 | Li | B08B 1/00 |
| 2020/0323412 A1 | 10/2020 | Arnold et al. | |
| 2020/0397204 A1 | 12/2020 | Norberg et al. | |
| 2021/0341932 A1 | 11/2021 | Lu et al. | |

FOREIGN PATENT DOCUMENTS

| | | |
|---|---|---|
| CN | 112183403 A | 1/2021 |
| CN | 112264419 A | 1/2021 |
| JP | H7-068056 A | 3/1995 |
| JP | H7-281752 A | 10/1995 |
| JP | 2000-353014 A | 12/2000 |
| JP | 2007-272664 A | 10/2007 |
| JP | 2009-061530 A | 3/2009 |
| JP | 2012-210395 A | 11/2012 |
| JP | 2013-141341 A | 7/2013 |
| JP | 2014-240054 A | 12/2014 |
| JP | 2015-013281 A | 1/2015 |
| JP | 3200455 U | 10/2015 |
| JP | 2016/001944 A1 | 1/2016 |
| JP | 2019-052954 A | 4/2019 |
| JP | 2020-171684 A | 10/2020 |
| KR | 20190130944 A | 11/2019 |
| WO | 2019/215756 A1 | 11/2019 |
| WO | 2021/070960 A1 | 4/2021 |

OTHER PUBLICATIONS

Shui-shih Chen, "Cleaning path guidance method combined with dirt detection mechanism" (ip.com machine translation of 2012-210395A), Nov. 1, 2012, ip.com machine translation (Year: 2012).*

Ravankar, A., et al., "Multi-robot path planning for smart access of distributed charging points in map," Artificial Life and Robotics, (2021).

* cited by examiner

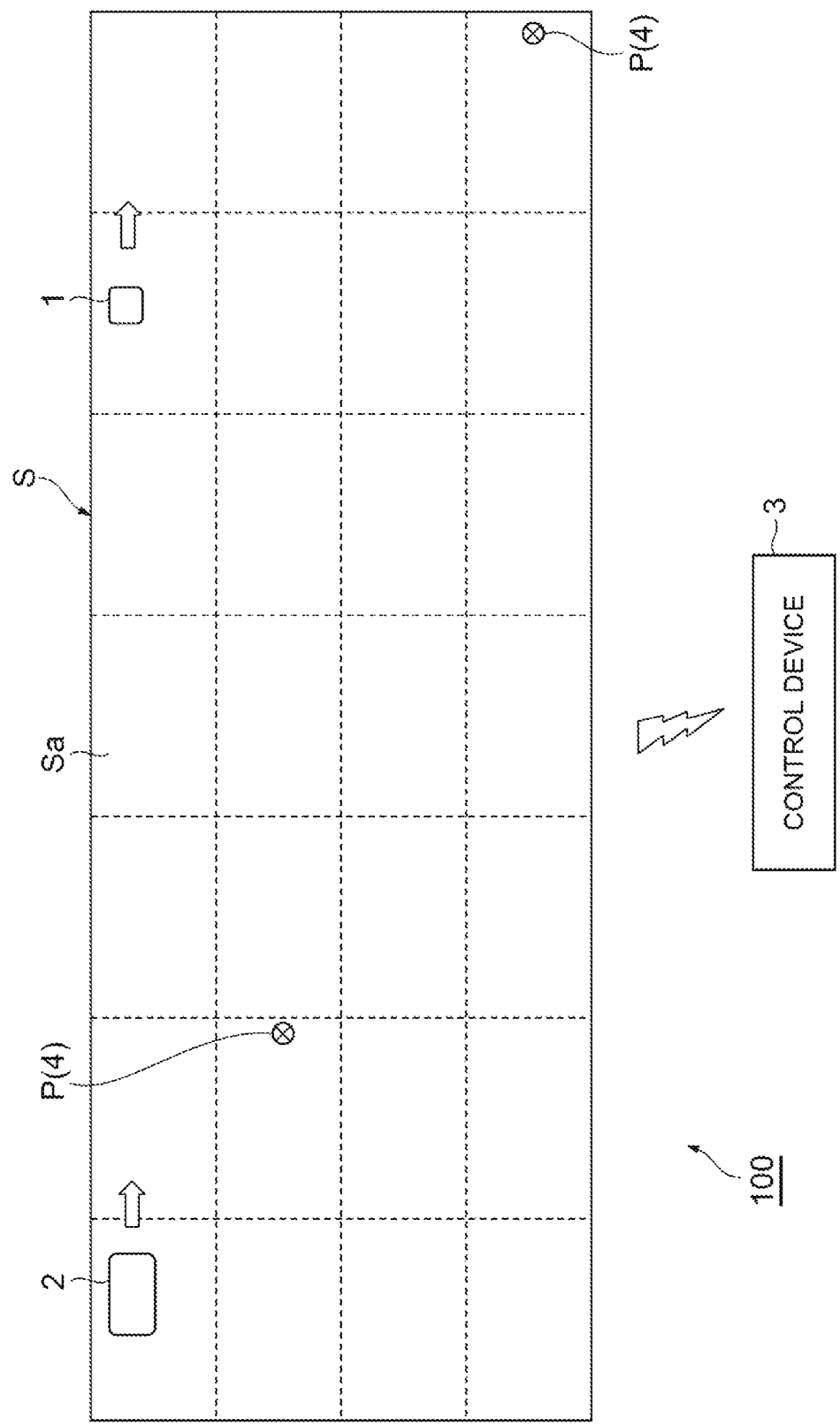

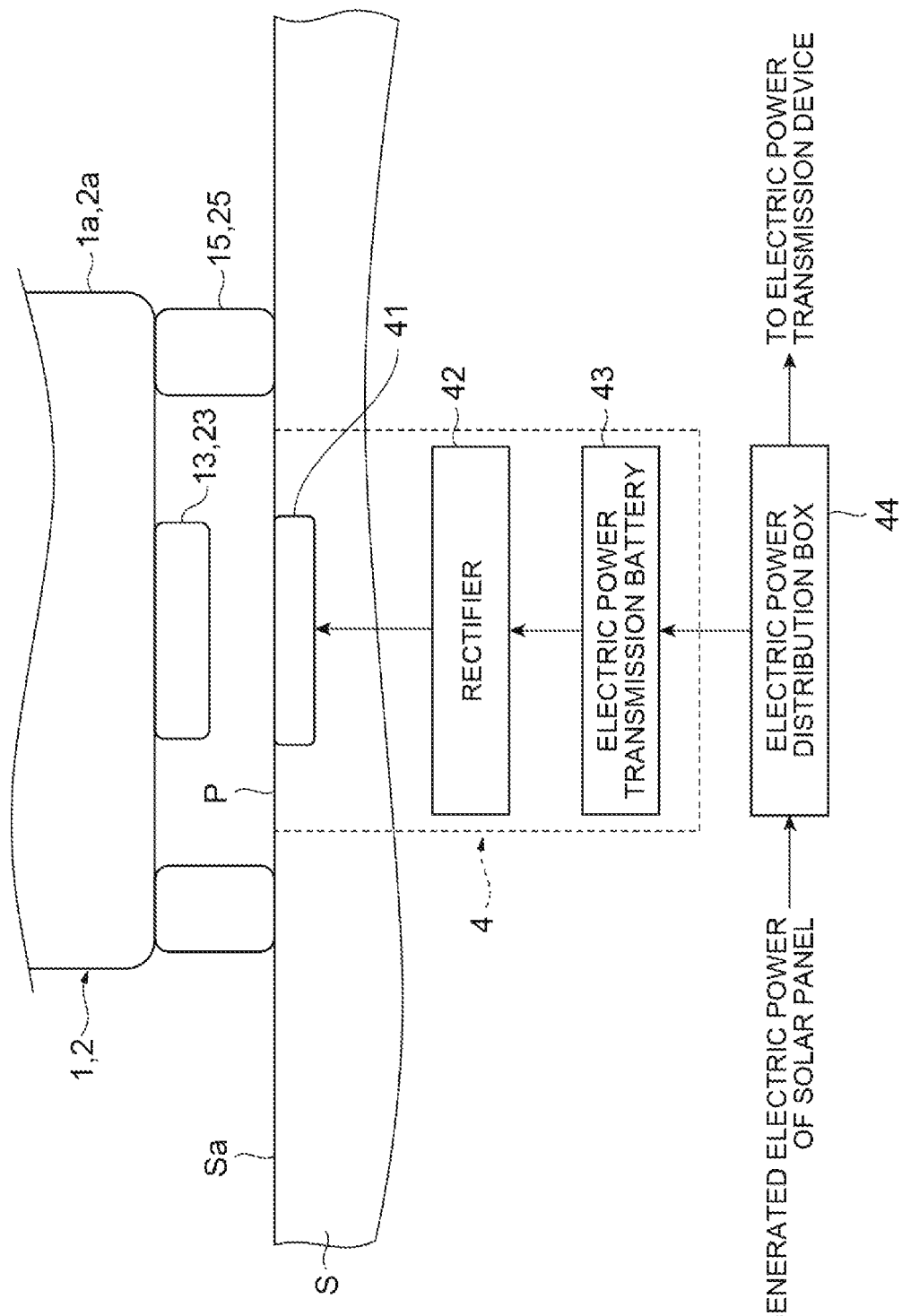

SOLAR PANEL CLEANING SYSTEM AND CLEANING PATH GENERATION DEVICE

CROSS-REFERENCE TO RELATED APPLICATIONS

This application claims the benefit of priority from Japanese Patent Application No. 2021-082559, filed on May 14, 2021, the entire contents of which are incorporated herein by reference.

BACKGROUND

There is a self-propelled traveling vehicle serving as a device for cleaning a solar panel performing solar power generation. For example, such a traveling vehicle is described in Japanese Unexamined Patent Publication No. 2015-13281. In this traveling vehicle, a camera for detecting dirt and a cleaning tool for eliminating dirt on a solar panel are mounted. Further, this traveling vehicle detects dirt in the vicinity thereof using the camera while moving and eliminates dirt using the mounted cleaning tool.

SUMMARY

According to an aspect of the present disclosure, there is provided a solar panel cleaning system including a detection traveling vehicle configured to travel on a solar panel and detect dirt on the solar panel, a map generation part configured to generate a dirt map including a dirt position of dirt on the solar panel on the basis of detection results of the detection traveling vehicle, a cleaning path generation part configured to generate a cleaning path for performing cleaning of the solar panel on the basis of the generated dirt map, and a cleaning traveling vehicle configured to travel on the solar panel on the basis of the generated cleaning path and perform cleaning of the solar panel.

BRIEF DESCRIPTION OF DRAWINGS

FIG. 1 is a view illustrating a schematic constitution of a solar panel cleaning system according to an embodiment.

FIG. 6 is a block diagram illustrating a schematic constitution of a charging device.

DETAILED DESCRIPTION

Figure 2A:
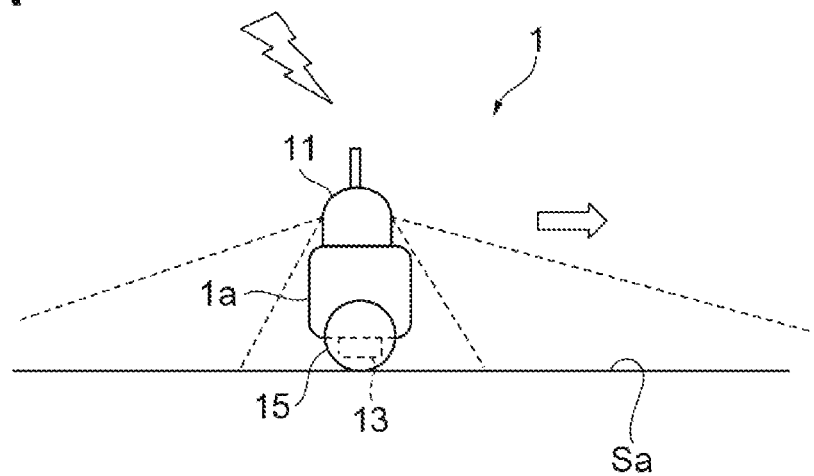
FIG. 2A is a side view illustrating a schematic constitution of a detection traveling vehicle.

In such a traveling vehicle described above, in order to detect dirt on a solar panel, there is a need to approach a region thereof once and perform sensing even if there is no dirt. For this reason, it becomes necessary to unnecessarily travel to detect dirt while having a cleaning tool mounted therein.

Hence, in the present disclosure, a solar panel cleaning system capable of efficiently cleaning off dirt on a solar panel using a cleaning traveling vehicle, and a cleaning path generation device will be described.

According to an aspect of the present disclosure, there is provided a solar panel cleaning system including a detection traveling vehicle configured to travel on a solar panel and detect dirt on the solar panel, a map generation part configured to generate a dirt map including a dirt position of the dirt on the solar panel on the basis of detection results of the detection traveling vehicle, a cleaning path generation part configured to generate a cleaning path for performing cleaning of the solar panel on the basis of the generated dirt map, and a cleaning traveling vehicle configured to travel on the solar panel on the basis of the generated cleaning path and perform cleaning of the solar panel.

In this solar panel cleaning system, a dirt map is generated on the basis of dirt detection results of the detection traveling vehicle, and a cleaning path of the cleaning traveling vehicle is generated on the basis of the dirt map. The cleaning traveling vehicle travels on the solar panel and performs cleaning on the basis of the generated cleaning path. In this manner, the cleaning traveling vehicle can efficiently travel and perform cleaning on the basis of the generated cleaning path. As above, the solar panel cleaning system can efficiently clean off dirt on the solar panel using the cleaning traveling vehicle.

In the foregoing solar panel cleaning system, the map generation part may detect a dirt degree of the dirt on the solar panel on the basis of detection results of the detection traveling vehicle and generate the dirt map including the dirt position and the dirt degree on the solar panel. The cleaning path generation part may generate the cleaning path such that the cleaning traveling vehicle passes through the dirt position of the dirt a plurality of times when the dirt degree is higher than a predetermined reference dirt degree. In this case, the cleaning traveling vehicle can pass through a part having a high dirt degree a plurality of times and can more reliably eliminate dirt.

In the foregoing solar panel cleaning system, the map generation part may detect a dirt degree of the dirt on the solar panel on the basis of detection results of the detection traveling vehicle and generate the dirt map including the dirt position and the dirt degree on the solar panel. The cleaning path generation part may further generate a traveling speed for the cleaning traveling vehicle to travel along the cleaning path such that a speed for the cleaning traveling vehicle to pass through the dirt position of the dirt is reduced in a case where the dirt degree is high compared to a case where the dirt degree is low. The cleaning traveling vehicle may travel on the solar panel on the basis of the generated cleaning path and the generated traveling speed. In this case, the cleaning traveling vehicle can travel in a part having a high dirt degree at a low speed and can more reliably eliminate dirt while traveling at a low speed.

In the foregoing solar panel cleaning system, the map generation part may detect a dirt degree of the dirt on the solar panel on the basis of detection results of the detection traveling vehicle and generate the dirt map including the dirt position and the dirt degree on the solar panel. The cleaning path generation part may generate the cleaning path including the dirt degree of the dirt present on the cleaning path when the cleaning path is generated. The cleaning traveling vehicle may change a mode of cleaning in accordance with the dirt degree included in the cleaning path. In this case, the cleaning traveling vehicle can more reliably eliminate dirt by changing the mode of cleaning in accordance with the dirt degree.

In the foregoing solar panel cleaning system, the solar panel may be provided with a charging point having a charging device for charging a battery of the cleaning traveling vehicle installed thereat. The cleaning path generation part may generate the cleaning path such that the cleaning traveling vehicle stops by the charging point before a quantity of electric power in the battery becomes equal to or smaller than a predetermined quantity. The cleaning traveling vehicle may charge the battery at the charging point. In this case, in the solar panel cleaning system, stopping of the cleaning traveling vehicle on the solar panel due to an insufficient residual quantity of electric power in the battery can be curbed.

In the foregoing solar panel cleaning system, the cleaning traveling vehicle may clean an electric power transmission portion of the charging device before arriving at the charging point and performing charging of the battery. In this case, in the solar panel cleaning system, poor electric power transmission due to dirt in the electric power transmission portion of the charging device can be curbed.

According to another aspect of the present disclosure, there is provided a cleaning path generation device including a cleaning path generation part configured to generate a cleaning path for performing cleaning by causing a cleaning traveling vehicle to travel on a solar panel on the basis of a dirt map including a dirt position of dirt on the solar panel.

In this cleaning path generation device, a cleaning path of the cleaning traveling vehicle is generated on the basis of the dirt map. The cleaning traveling vehicle can efficiently travel on the solar panel and perform cleaning by traveling on the basis of the generated cleaning path. As above, the cleaning path generation device can efficiently clean off dirt on the solar panel using the cleaning traveling vehicle.

In the foregoing cleaning path generation device, the dirt map may further include a dirt degree of the dirt on the solar panel. The cleaning path generation part may generate the cleaning path such that the cleaning traveling vehicle passes through the dirt position of the dirt a plurality of times when the dirt degree is higher than a predetermined reference dirt degree. In this case, the cleaning path generation device can cause the cleaning traveling vehicle to pass through a part having a high dirt degree a plurality of times and can more reliably eliminate dirt using the cleaning traveling vehicle.

In the foregoing cleaning path generation device, the dirt map may further include a dirt degree of the dirt on the solar panel. The cleaning path generation part may further generate a traveling speed for the cleaning traveling vehicle to travel along the cleaning path such that a speed for the cleaning traveling vehicle to pass through the dirt position of the dirt is reduced in a case where the dirt degree is high compared to a case where the dirt degree is low. In this case, the cleaning path generation device can cause the cleaning traveling vehicle to travel in a part having a high dirt degree at a low speed and can more reliably eliminate dirt while causing the cleaning traveling vehicle to travel at a low speed.

In the foregoing cleaning path generation device, the solar panel may be provided with a charging point having a charging device for charging a battery of the cleaning traveling vehicle installed thereat. The cleaning path generation part may generate the cleaning path such that the cleaning traveling vehicle stops by the charging point before a quantity of electric power in the battery becomes equal to or smaller than a predetermined quantity. In this case, in the cleaning path generation device, stopping of the cleaning traveling vehicle on the solar panel due to an insufficient residual quantity of electric power in the battery can be curbed.

According to various aspects of the present disclosure, it is possible to efficiently clean off dirt on the solar panel using the cleaning traveling vehicle.

Hereinafter, an embodiment of the present disclosure will be described with reference to the drawings. It should be noted that the same reference signs will be applied to elements which are the same as or correspond to each other in each of the diagrams and duplicate description thereof will be omitted.

As illustrated in FIG. 1, a solar panel cleaning system 100 performs cleaning on an upper surface (light receiving surface Sa) of a solar panel S. The solar panel S is constituted of one or a plurality of solar panel bodies. In addition, the solar panel S is installed such that the light receiving surface Sa is directed in the direction of the sun and the light receiving surface Sa is inclined with respect to a horizontal direction. For example, the solar panel cleaning system 100 performs cleaning of the solar panel S in mega solar equipment having an extremely large light receiving surface Sa.

The solar panel cleaning system 100 includes a detection traveling vehicle 1, a cleaning traveling vehicle 2, a control device 3, and a charging device 4. It should be noted that FIG. 1 illustrates a case where the solar panel cleaning system 100 includes one of each of the detection traveling vehicle 1 and the cleaning traveling vehicle 2. However, the number of detection traveling vehicles 1 and the number of cleaning traveling vehicles 2 provided in the solar panel cleaning system 100 are not limited to one of each thereof. In addition, the number of detection traveling vehicles 1 and the number of cleaning traveling vehicles 2 may differ from each other. For example, the number of cleaning traveling vehicles 2 included in the solar panel cleaning system 100 may be larger than the number of detection traveling vehicles 1.

The detection traveling vehicle 1 is a self-propelled traveling vehicle and detects dirt on the solar panel S (light receiving surface Sa). The cleaning traveling vehicle 2 is a self-propelled traveling vehicle and performs cleaning on the solar panel S (light receiving surface Sa). The control device 3 performs control for causing the cleaning traveling vehicle 2 to perform cleaning off of dirt detected by the detection traveling vehicle 1. The charging device 4 is installed at a charging point P set in the solar panel S. The charging device 4 supplies electric power to the detection traveling vehicle 1 and the cleaning traveling vehicle 2 and charges batteries 14 and 24 (refer to FIGS. 3 and 4) which are respectively mounted in the traveling vehicles. Hereinafter, details of each of the portions of the solar panel cleaning system 100 will be described.

[Detection Traveling Vehicle]

Figure 3:
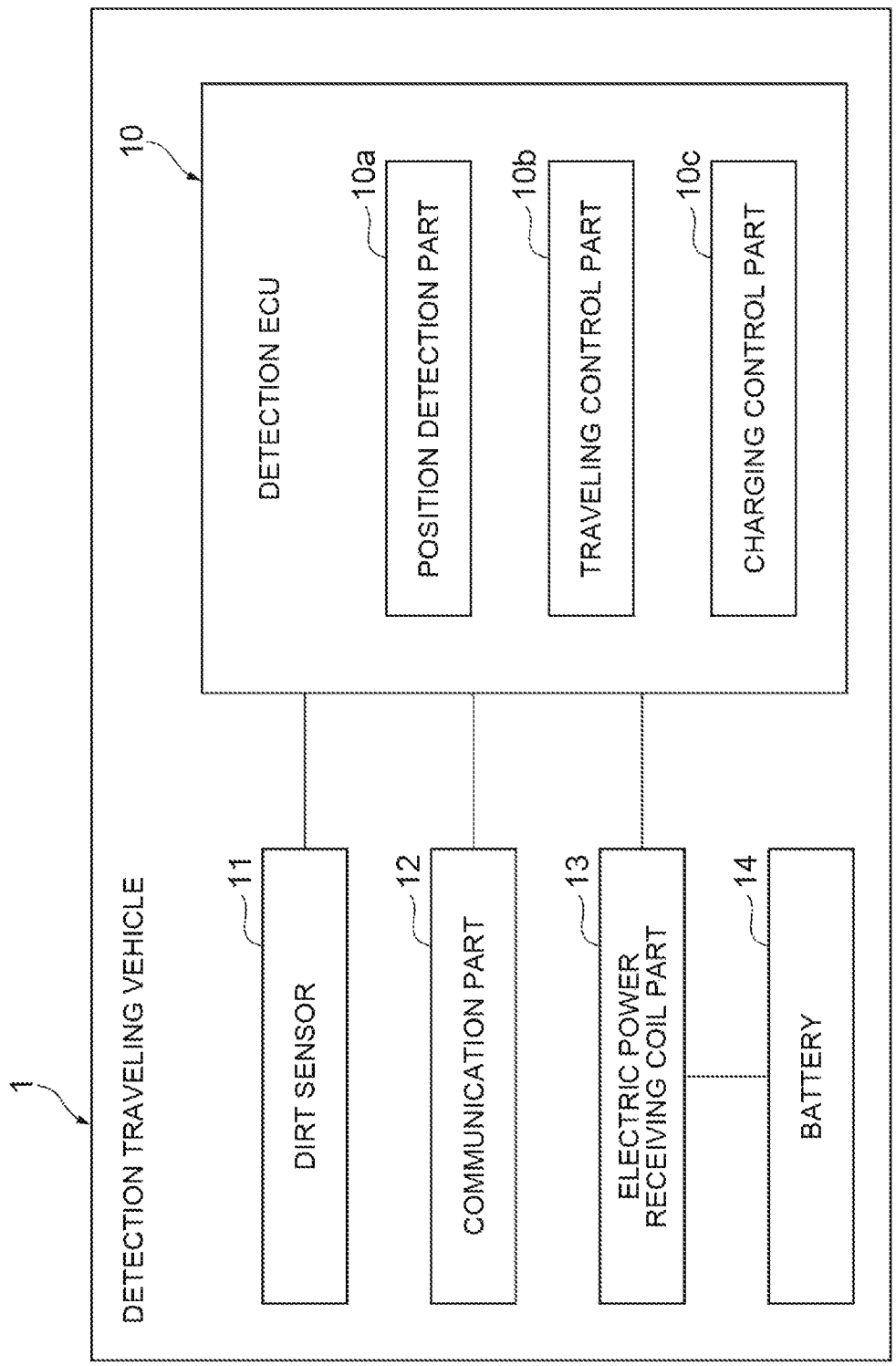
FIG. 3 is a block diagram illustrating a schematic constitution of the detection traveling vehicle.

As illustrated in FIGS. 2A and 3, the detection traveling vehicle 1 travels on the light receiving surface Sa of the solar panel S and detects dirt on the light receiving surface Sa. The detection traveling vehicle 1 is constituted to include a detection electronic control unit (ECU) 10, a dirt sensor 11, a communication part 12, an electric power receiving coil part 13, and the battery 14.

The dirt sensor 11 is a sensor for detecting dirt on the light receiving surface Sa of the solar panel S. Various known sensors for detecting dirt can be used as the dirt sensor 11. For example, the dirt sensor 11 may include at least any of elements such as a glossmeter, an illuminometer, a visible light camera, and an infrared camera. The dirt sensor 11 takes the light receiving surface Sa in the vicinity of (for example, on a side in front in a proceeding direction) the detection traveling vehicle 1 as a detection range and detects dirt on the light receiving surface Sa.

The communication part 12 is a communication instrument for performing radio communication with the control device 3. The communication part 12 may directly perform communication with the control device 3 or may perform communication via a means such as an access point provided near the solar panel S, or a communication network.

The electric power receiving coil part 13 receives electric power supplied from the charging device 4 when the detection traveling vehicle 1 arrives at the charging point P. The electric power receiving coil part 13 includes an electric power receiving coil for receiving electric power supplied from the charging device 4 in a non-contact manner. For example, the electric power receiving coil part 13 is provided on a lower surface of a main body part 1a of the detection traveling vehicle 1. An electric power receiving surface of the electric power receiving coil part 13 faces the light receiving surface Sa side. Charging of the battery 14 mounted in the detection traveling vehicle 1 is performed by means of electric power received by the electric power receiving coil part 13.

The battery 14 serves as an electric power source for causing the detection traveling vehicle 1 to travel and operating each of the portions.

The detection ECU 10 controls operation of each of the portions in the detection traveling vehicle 1. The detection ECU 10 is an electronic control unit having elements such as a central processing unit (CPU), a read only memory (ROM), and a random access memory (RAM). In the detection ECU 10, for example, various functions are realized by the CPU executing a program stored in the ROM. The detection ECU 10 may be constituted of a plurality of electronic units.

The detection ECU 10 functionally includes a position detection part 10a, a traveling control part 10b, and a charging control part 10c.

The position detection part 10a detects a position of the detection traveling vehicle 1 on the solar panel S. For example, the position detection part 10a can detect the position of the detection traveling vehicle 1 by various known methods such as a method using a global positioning system (GPS) signal.

In addition, the position detection part 10a generates dirt information including detection results of the dirt sensor 11, and the position of the detection traveling vehicle 1 at the time when the dirt sensor 11 detects dirt. The position detection part 10a transmits the generated dirt information to the control device 3 via the communication part 12. This dirt information indicates the presence or absence of dirt on the solar panel S, and a position of dirt at the time when dirt is present.

The traveling control part 10b performs control for causing the detection traveling vehicle 1 to automatically travel on the solar panel S. The traveling control part 10b causes wheels 15 (refer to FIG. 2A) to be driven by an electric motor (not illustrated) operated by means of electric power of the battery 14 and causes the detection traveling vehicle 1 to travel. It should be noted that the traveling control part 10b causes the detection traveling vehicle 1 to automatically travel by a known method on the basis of information such as a position of the detection traveling vehicle 1 detected by the position detection part 10a, and an outside situation of the detection traveling vehicle 1. For example, regarding the outside situation of the detection traveling vehicle 1, the detection traveling vehicle 1 can use a light detection and ranging (LIDAR) mounted in the detection traveling vehicle 1 and/or detection results of the visible light camera.

In addition, the traveling control part 10b generates a dirt detection path for detecting dirt such that dirt can be detected by the dirt sensor 11 over the entirety of the light receiving surface Sa of the solar panel S. Further, the traveling control part 10b causes the detection traveling vehicle 1 to travel on the solar panel S along the generated dirt detection path. It should be noted that the traveling control part 10b may not only generate a dirt detection path by itself, for example, but also acquire a dirt detection path from the control device 3 via the communication part 12 and cause the detection traveling vehicle 1 to travel along the acquired dirt detection path.

It should be noted that the traveling control part 10b generates a dirt detection path such that the detection traveling vehicle 1 stops by the charging point P before the quantity of electric power in the battery 14 becomes equal to or smaller than a predetermined quantity. However, a case where a residual quantity of electric power in the battery 14 decreases earlier than previously assumed is conceivable. For this reason, the traveling control part 10b monitors the residual quantity of electric power in the battery 14. Further, when it seems that the quantity of electric power in the battery 14 has become equal to or smaller than the predetermined quantity earlier than assumed, the traveling control part 10b generates a path liberated from the original dirt detection path toward the charging point P and causes the detection traveling vehicle 1 to travel toward the charging point P. After charging of the battery 14 is performed at the charging point P, the traveling control part 10b may cause the detection traveling vehicle 1 to travel again toward the original dirt detection path.

The charging control part 10c performs control for reception of electric power performed by the electric power receiving coil part 13 from the charging device 4 when the detection traveling vehicle 1 arrives at the charging point P. In addition, the charging control part 10c performs control for charging the battery 14 by means of electric power received by the electric power receiving coil part 13.

It should be noted that an example of a structure of the detection traveling vehicle 1 is illustrated in FIG. 2A. However, the structure of the detection traveling vehicle 1 is not limited to the structure illustrated in FIG. 2A.

[Cleaning Traveling Vehicle]

Figure 2B:
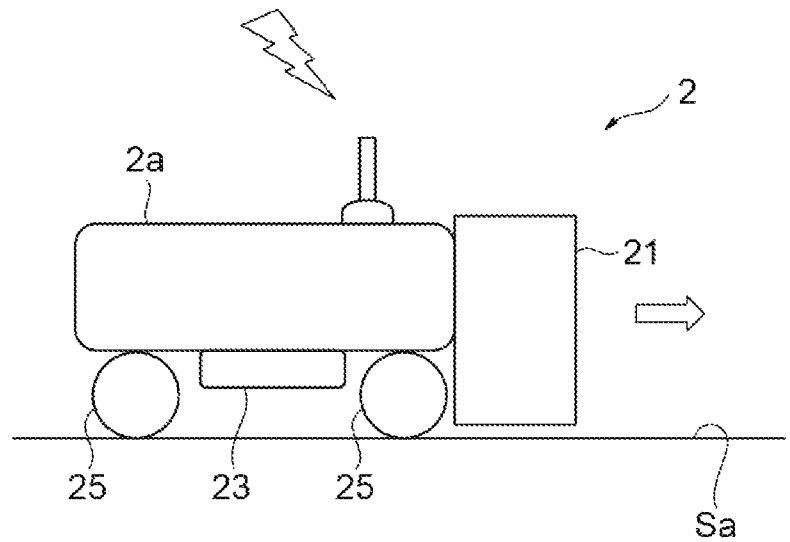
FIG. 2B is a side view illustrating a schematic constitution of a cleaning traveling vehicle.
Figure 4:
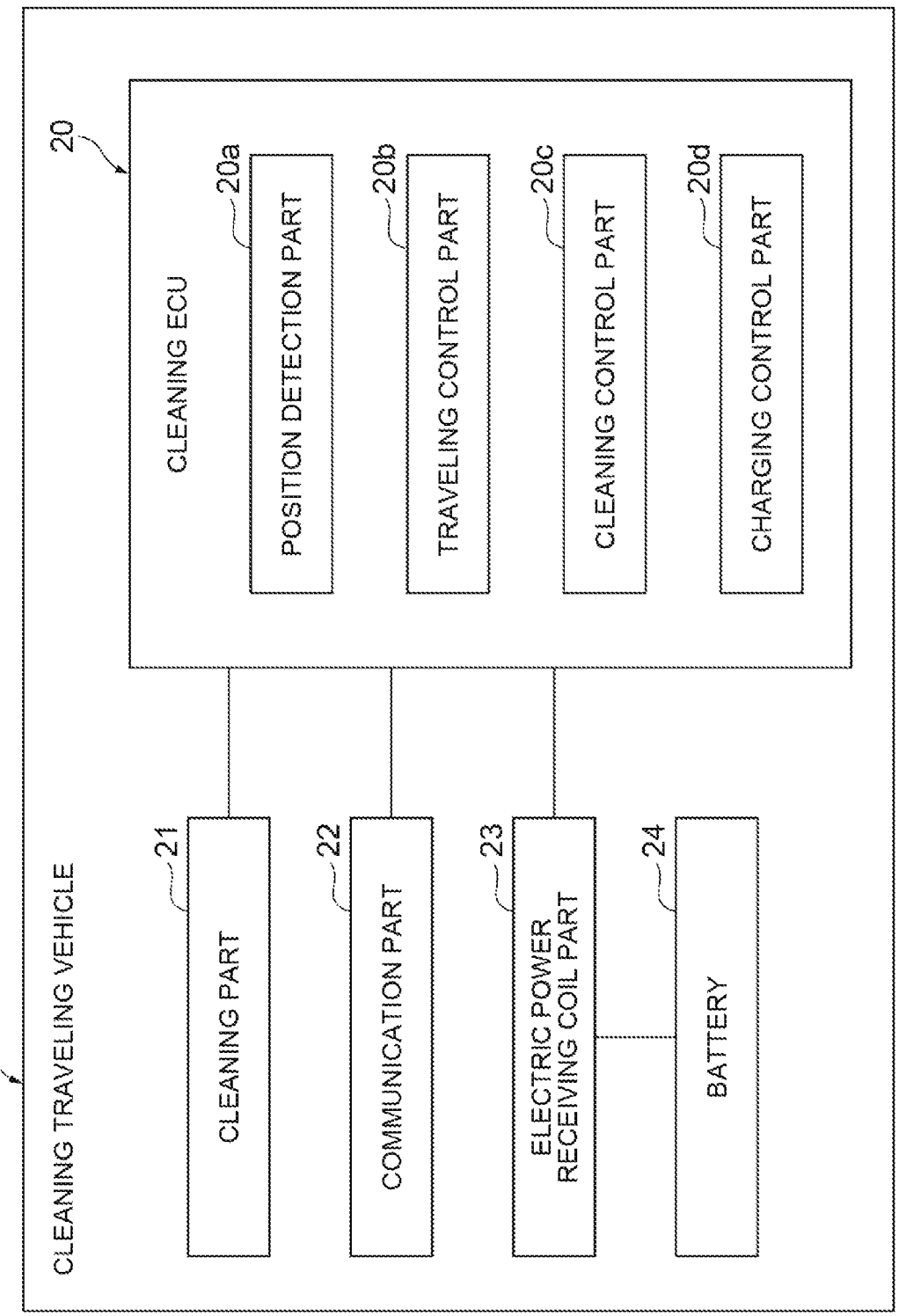
FIG. 4 is a block diagram illustrating a schematic constitution of the cleaning traveling vehicle.

As illustrated in FIGS. 2B and 4, the cleaning traveling vehicle 2 travels on the light receiving surface Sa of the solar panel S on the basis of a cleaning path generated by the control device 3 and performs cleaning of the light receiving surface Sa. The cleaning traveling vehicle 2 is constituted to include a cleaning ECU 20, a cleaning part 21, a communication part 22, an electric power receiving coil part 23, and the battery 24.

The cleaning part 21 includes a cleaning tool for cleaning the light receiving surface Sa. As a cleaning tool, for example, the cleaning part 21 includes elements such as a cleaning brush, rinse water, and a detergent. The cleaning part 21 operates when the cleaning traveling vehicle 2 arrives at a part where there is dirt on the light receiving surface Sa and performs work of eliminating dirt. Namely, the cleaning part 21 does not operate for a part where there is no dirt on the light receiving surface Sa. However, the cleaning part 21 may be constituted to perform cleaning at all times while the cleaning traveling vehicle 2 is traveling according to an instruction from a cleaning control part 20c of the cleaning ECU 20.

The communication part 22 is a communication instrument for performing radio communication with the control device 3. The communication part 22 may directly perform communication with the control device 3 or may perform communication via a means such as an access point provided near the solar panel S, or a communication network.

The electric power receiving coil part 23 receives electric power supplied from the charging device 4 when the cleaning traveling vehicle 2 arrives at the charging point P. The electric power receiving coil part 23 includes an electric power receiving coil for receiving electric power supplied from the charging device 4 in a non-contact manner. For example, the electric power receiving coil part 23 is provided on a lower surface of a main body part 2a of the cleaning traveling vehicle 2. An electric power receiving surface of the electric power receiving coil part 23 faces the light receiving surface Sa side. Charging of the battery 24 mounted in the cleaning traveling vehicle 2 is performed by means of electric power received by the electric power receiving coil part 23.

The battery 24 serves as an electric power source for causing the cleaning traveling vehicle 2 to travel and operating each of the portions such as the cleaning part 21.

The cleaning ECU 20 controls operation of each of the portions in the cleaning traveling vehicle 2. The cleaning ECU 20 is an electronic control unit having a constitution similar to that of the detection ECU 10.

The cleaning ECU 20 functionally includes a position detection part 20a, a traveling control part 20b, the cleaning control part 20c, and a charging control part 20d.

The position detection part 20a detects a position of the cleaning traveling vehicle 2 on the solar panel S. For example, the position detection part 10a can detect the position of the cleaning traveling vehicle 2 by various known methods such as a method using a GPS signal.

The traveling control part 20b performs control for causing the cleaning traveling vehicle 2 to automatically travel on the solar panel S. The traveling control part 20b causes wheels 25 (refer to FIG. 2B) to be driven by an electric motor (not illustrated) operated by means of electric power of the battery 24 and causes the cleaning traveling vehicle 2 to travel. It should be noted that the traveling control part 20b causes the cleaning traveling vehicle 2 to automatically travel by a known method on the basis of information such as a position of the cleaning traveling vehicle 2 detected by the position detection part 20a, and an outside situation of the cleaning traveling vehicle 2. For example, regarding the outside situation of the cleaning traveling vehicle 2, the cleaning traveling vehicle 2 can use detection results of a LIDAR and/or the visible light camera mounted in the cleaning traveling vehicle 2.

It should be noted that the traveling control part 20b acquires a cleaning path from the control device 3 via the communication part 22. The traveling control part 20b causes the cleaning traveling vehicle 2 to travel on the solar panel S along the acquired cleaning path. In addition, the traveling control part 20b may acquire a traveling speed together with a cleaning path. In this case, the traveling control part 20b causes the cleaning traveling vehicle 2 to travel along the cleaning path in accordance with the acquired traveling speed.

It should be noted that a cleaning path acquired from the control device 3 is a path through which the cleaning traveling vehicle 2 stops by the charging point P before the quantity of electric power in the battery 24 of the cleaning traveling vehicle 2 becomes equal to or smaller than the predetermined quantity. However, a case where a residual quantity of electric power in the battery 24 decreases earlier than previously assumed is conceivable. For this reason, the traveling control part 20b monitors the residual quantity of electric power in the battery 24. Further, when it seems that the quantity of electric power in the battery 24 has become equal to or smaller than the predetermined quantity earlier than assumed, the traveling control part 20b generates a path liberated from the original cleaning path toward the charging point P and causes the cleaning traveling vehicle 2 to travel toward the charging point P. After charging of the battery 24 is performed at the charging point P, the traveling control part 20b may cause the cleaning traveling vehicle 2 to travel again toward the original cleaning path.

The cleaning control part 20c controls operation of the cleaning part 21. Here, a cleaning path acquired from the control device 3 includes a dirt position of dirt present on the light receiving surface Sa. For this reason, the cleaning control part 20c performs elimination of dirt by operating the cleaning part 21 when the cleaning traveling vehicle 2 traveling along the cleaning path reaches the dirt position.

In addition, a cleaning path may include a dirt state of dirt present on the light receiving surface Sa. In this case, the cleaning control part 20c may change a mode of cleaning performed by the cleaning part 21 in accordance with the dirt state. For example, the cleaning control part 20c may change the mode of cleaning performed by the cleaning part 21 in accordance with a dirt degree included in the dirt state. As an example, when the degree of dirt is high, the cleaning control part 20c may perform control of the cleaning part 21 such that the cleaning brush is strongly pushed against the light receiving surface Sa. In addition, for example, the cleaning control part 20c may change the mode of cleaning performed by the cleaning part 21 in accordance with a kind of dirt included in the dirt state. As an example, the cleaning control part 20c may change the mode such as the kind of a detergent to be sprayed and/or a pushing strength of the cleaning brush in accordance with the kind of dirt.

In addition, the cleaning control part 20c controls the cleaning part 21 such that cleaning of an electric power transmission surface of an electric power transmission coil part 41 of the charging device 4 (upper surface of the electric power transmission coil part 41 (electric power transmission portion)) (refer to FIG. 6) is performed before the cleaning traveling vehicle 2 arrives at the charging point P and performs charging of the battery 24.

The charging control part 20d performs control for reception of electric power performed by the electric power receiving coil part 23 from the charging device 4 when the cleaning traveling vehicle 2 arrives at the charging point P. In addition, the charging control part 20d performs control for charging the battery 24 by means of electric power received by the electric power receiving coil part 23.

It should be noted that an example of a structure of the cleaning traveling vehicle 2 is illustrated in FIG. 2B. However, the structure of the cleaning traveling vehicle 2 is not limited to the structure illustrated in FIG. 2B.

[Control Device]

Figure 5:
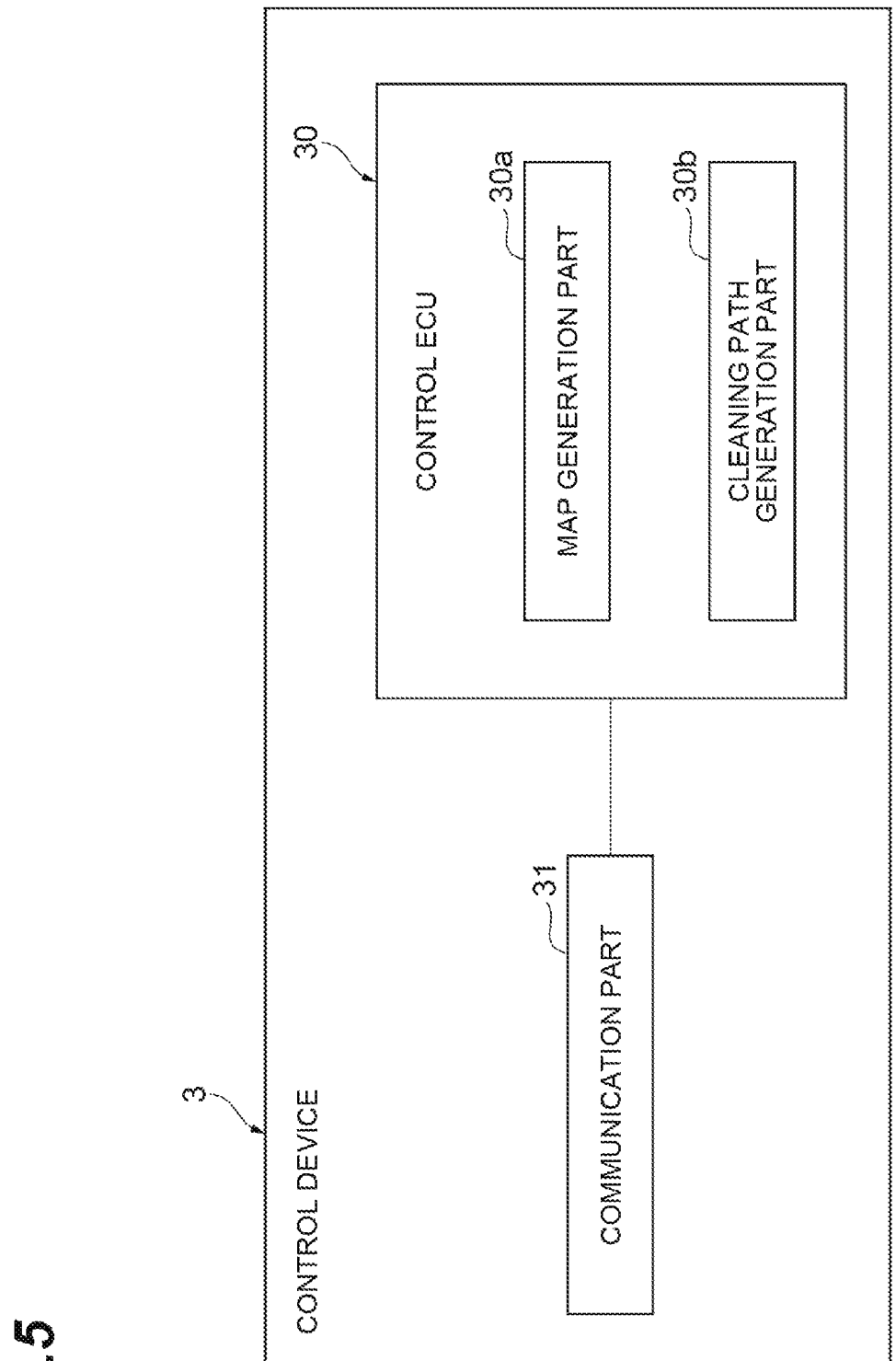
FIG. 5 is a block diagram illustrating a schematic constitution of a control device.

As illustrated in FIG. 5, the control device 3 acquires dirt information detected by the detection traveling vehicle 1. Further, the control device 3 causes the cleaning traveling vehicle 2 to travel such that dirt on the light receiving surface Sa is eliminated on the basis of the dirt information. The control device 3 is constituted separately from the detection traveling vehicle 1 and the cleaning traveling vehicle 2, for example, by a means such as a server installed at a place such as a control chamber of the solar panel cleaning system 100, or a server on a cloud.

More specifically, the control device 3 is constituted to include a control ECU 30 and a communication part 31. The communication part 31 is a communication instrument for performing radio communication with the detection traveling vehicle 1 and the cleaning traveling vehicle 2. The communication part 31 may directly perform communication with the detection traveling vehicle 1 and the cleaning traveling vehicle 2 or may perform communication via a means such as an access point provided near the solar panel S, or a communication network.

The control ECU 30 is an electronic control unit having a constitution similar to that of the detection ECU 10. The control ECU 30 functionally includes a map generation part 30a and a cleaning path generation part (cleaning path generation device) 30b.

The map generation part 30a generates a dirt map indicating dirt on the light receiving surface Sa of the solar panel S on the basis of dirt detection results of the detection traveling vehicle 1. Specifically, the map generation part 30a acquires dirt information transmitted from the detection traveling vehicle 1 via the communication part 31. The map generation part 30a generates a dirt map on the basis of the acquired dirt information. Here, the map generation part 30a generates a dirt map including a dirt position and a dirt state of dirt on the light receiving surface Sa of the solar panel S on the basis of the dirt information.

The map generation part 30a can detect the presence or absence of dirt and a range of dirt based on various known methods on the basis of detection results of the dirt sensor 11. In addition, the map generation part 30a can detect a position of dirt on the basis of the position of the detection traveling vehicle 1 at the time when the dirt sensor 11 detects dirt.

The map generation part 30a can detect a dirt state of dirt on the basis of detection results of the dirt sensor 11 included in the dirt information. For example, this dirt state includes information such as a dirt degree and a kind of dirt. For example, the map generation part 30a can detect a dirt state such as a dirt degree and a kind of dirt by performing known image processing with respect to detection results of the dirt sensor 11 (such as images captured by a visible camera or an infrared camera).

The cleaning path generation part 30b generates a cleaning path for the cleaning traveling vehicle 2 performing cleaning of the light receiving surface Sa of the solar panel S on the basis of a dirt map generated by the map generation part 30a. This cleaning path includes a dirt position of dirt present on the light receiving surface Sa. Here, the cleaning path generation part 30b generates a cleaning path on the basis of the dirt map such that it successively goes around dirty areas on the light receiving surface Sa. For example, the cleaning path generation part 30b can generate a cleaning path such that it successively goes around a plurality of dirty areas on the light receiving surface Sa through the shortest path.

The cleaning path generation part 30b transmits the generated cleaning path to the cleaning traveling vehicle 2 via the communication part 31. The cleaning traveling vehicle 2 receives the cleaning path transmitted from the cleaning path generation part 30b via the communication part 22. Accordingly, the cleaning traveling vehicle 2 can successively go around areas of dirt on the light receiving surface Sa and can perform elimination of dirt by traveling along the cleaning path.

It should be noted that dirt may cover a wide range in a dirty area. In this case, the cleaning path generation part 30b may generate a cleaning path for traveling while reciprocating within a dirty region such that the cleaning traveling vehicle 2 can eliminate dirt covering the wide range. Accordingly, even when dirt covers a wide range, the cleaning traveling vehicle 2 can perform elimination of the dirt.

In addition, the cleaning path generation part 30b can generate a cleaning path on the basis of the dirt degree of the dirt state included in a dirt map. Here, when the dirt degree of dirt on the light receiving surface Sa is higher than a predetermined reference dirt degree, the cleaning path generation part 30b can generate a cleaning path such that the cleaning traveling vehicle 2 passes through the dirt position of the dirt a plurality of times. In this manner, the cleaning path generation part 30b can control the number of times the cleaning traveling vehicle 2 passes over the dirt in accordance with the dirt degree. Namely, the cleaning path generation part 30b can control the number of times of cleaning by the cleaning traveling vehicle 2 in accordance with the dirt degree.

The cleaning path generation part 30b transmits a cleaning path generated in accordance with the dirt degree to the cleaning traveling vehicle 2 via the communication part 31. The cleaning traveling vehicle 2 receives the cleaning path transmitted from the cleaning path generation part 30b via the communication part 22. The cleaning traveling vehicle 2 travels on the basis of a cleaning path generated in accordance with the dirt degree. Accordingly, the cleaning traveling vehicle 2 can perform elimination of dirt while passing through the dirty area once or a plurality of times in accordance with the dirt degree.

Moreover, the cleaning path generation part 30b can further generate a traveling speed for the cleaning traveling vehicle 2 to travel along the cleaning path. In this case, the cleaning path generation part 30b can generate a traveling speed such that the speed for the cleaning traveling vehicle 2 to pass through the dirt position of the dirt is reduced in a case where the dirt degree of dirt on the light receiving surface Sa is high compared to a case where the dirt degree is low. In this manner, the cleaning path generation part 30b can control the speed for when the cleaning traveling vehicle 2 passes over the dirt in accordance with the dirt degree. Namely, the cleaning path generation part 30b can control the time taken for elimination of dirt by the cleaning part 21 of the cleaning traveling vehicle 2 in accordance with the dirt degree.

The cleaning path generation part 30b transmits a cleaning path and a traveling speed generated in accordance with the dirt degree to the cleaning traveling vehicle 2 via the communication part 31. The cleaning traveling vehicle 2 receives the cleaning path and the traveling speed generated in accordance with the dirt degree via the communication part 22. Further, the cleaning traveling vehicle 2 travels on the light receiving surface Sa on the basis of the cleaning path and the traveling speed which have been received. Accordingly, the cleaning traveling vehicle 2 can perform cleaning while changing the time taken for elimination of dirt in accordance with the dirt degree.

In addition, the cleaning path generation part 30b can generate a cleaning path including a dirt degree of dirt present on the cleaning path when a cleaning path is generated. Namely, the cleaning path includes information of the dirt degree of dirt present on the cleaning path. The cleaning path generation part 30b transmits the cleaning path including the dirt degree to the cleaning traveling vehicle 2 via the communication part 31. The cleaning traveling vehicle 2 receives the cleaning path including the dirt degree via the communication part 22. Further, the cleaning traveling vehicle 2 travels on the light receiving surface Sa along the cleaning path. At this time, the cleaning traveling vehicle 2 can change the mode of cleaning performed by the cleaning part 21 in accordance with the dirt degree.

It should be noted that the cleaning path generation part 30b generates a cleaning path in consideration of the residual quantity of electric power in the battery 24 of the cleaning traveling vehicle 2. Specifically, the cleaning path generation part 30b generates a cleaning path such that the cleaning traveling vehicle 2 stops by the charging point P before the quantity of electric power in the battery 24 of the cleaning traveling vehicle 2 becomes equal to or smaller than the predetermined quantity. It should be noted that the cleaning path generation part 30b can determine whether or not the residual quantity of electric power in the battery 24 becomes equal to or smaller than the predetermined quantity of electric power on the basis of information such as a traveling distance of the cleaning traveling vehicle 2 for when traveling along the cleaning path. Alternatively, the cleaning path generation part 30b may receive the residual quantity of electric power in the battery 24 from the cleaning traveling vehicle 2 via the communication part 31 when a cleaning path is generated. In this case, the cleaning path generation part 30b may generate a cleaning path on the basis of the received residual quantity of electric power in the battery 24 such that the cleaning traveling vehicle 2 stops by the charging point P before the quantity of electric power in the battery 24 becomes equal to or smaller than the predetermined quantity.

Namely, when it is predicted that the quantity of electric power in the battery 24 of the cleaning traveling vehicle 2 becomes equal to or smaller than the predetermined quantity, the cleaning path generation part 30b generates a path as a cleaning path which is liberated from the original cleaning path toward the nearest charging point P and returns to the original cleaning path after charging is completed. The cleaning traveling vehicle 2 can perform charging of the battery 24 at the charging point P before the quantity of electric power in the battery 24 becomes equal to or smaller than the predetermined quantity and can continue cleaning after charging is completed by traveling along this cleaning path.

In addition, the cleaning path generation part 30b may generate a dirt detection path of the detection traveling vehicle 1 in addition to a cleaning path of the cleaning traveling vehicle 2. In this case, the cleaning path generation part 30b generates a dirt detection path for detecting dirt such that dirt can be detected by the dirt sensor 11 over the entirety of the light receiving surface Sa of the solar panel S. The cleaning path generation part 30b transmits the dirt detection path to the detection traveling vehicle 1 via the communication part 31. The detection traveling vehicle 1 receives the dirt detection path via the communication part 12. Further, the detection traveling vehicle 1 can perform detection of dirt by traveling on the light receiving surface Sa along the received dirt detection path.

When a dirt detection path is generated, the cleaning path generation part 30b generates a dirt detection path in consideration of the residual quantity of electric power in the battery 14 of the detection traveling vehicle 1. Specifically, the cleaning path generation part 30b generates a dirt detection path such that the detection traveling vehicle 1 stops by the charging point P before the quantity of electric power in the battery 14 of the detection traveling vehicle 1 becomes equal to or smaller than the predetermined quantity. It should be noted that the cleaning path generation part 30b can determine whether or not the residual quantity of electric power in the battery 14 becomes equal to or smaller than the predetermined quantity of electric power on the basis of information such as a traveling distance of the detection traveling vehicle 1 for when traveling along the dirt detection path. Alternatively, the cleaning path generation part 30b may receive the residual quantity of electric power in the battery 14 from the detection traveling vehicle 1 via the communication part 31 when a dirt detection path is generated. In this case, the cleaning path generation part 30b may generate a dirt detection path on the basis of the received residual quantity of electric power in the battery 14 such that the detection traveling vehicle 1 stops by the charging point P before the quantity of electric power in the battery 14 becomes equal to or smaller than the predetermined quantity.

Namely, when it is predicted that the quantity of electric power in the battery 14 of the detection traveling vehicle 1 becomes equal to or smaller than the predetermined quantity, the cleaning path generation part 30b generates a path as a dirt detection path which is liberated from the original dirt detection path toward the nearest charging point P and returns to the original dirt detection path after charging is completed. The detection traveling vehicle 1 can perform charging of the battery 14 at the charging point P before the quantity of electric power in the battery 14 becomes equal to or smaller than the predetermined quantity and can continue detection of dirt after charging is completed by traveling along this dirt detection path.

In addition, for example, the control device 3 can receive an input of a confirmed area of dirt on the light receiving surface Sa from an operator of the solar panel cleaning system 100. Example of a confirmed area of dirt include areas such as an area where there is a high likelihood that a foreign matter be present on the light receiving surface Sa and it is conceivable that confirmation of dirt be necessary. When a confirmed area of dirt is input, the cleaning path generation part 30b causes the detection traveling vehicle 1 to travel toward the confirmed area of dirt and generates a dirt detection path for performing detection of dirt in the confirmed area of dirt. The detection traveling vehicle 1 can perform detection of dirt in a dirt detection area instructed by an operator by traveling on the basis of this dirt detection path.

It should be noted that the detection traveling vehicle 1 is not limited to transmitting dirt detection results to the control device 3 after processing of detecting dirt over the entire surface on the light receiving surface Sa has ended. The detection traveling vehicle 1 may transmit detection results such as the presence or absence of dirt to the control device 3 at all times while detecting dirt on the light receiving surface Sa. In this case, the control device 3 may generate a cleaning path every time a dirt detection result is received and may transmit a cleaning path to the cleaning traveling vehicle 2 every time a cleaning path is generated. Accordingly, the solar panel cleaning system 100 can perform cleaning of the light receiving surface Sa using the cleaning traveling vehicle 2 while detecting dirt using the detection traveling vehicle 1.

In addition, when a cleaning path of the cleaning traveling vehicle 2 is generated, the cleaning path generation part 30b generates a cleaning path such that the cleaning traveling vehicle 2 does not collide with the detection traveling vehicle 1. Similarly, when a dirt detection path of the detection traveling vehicle 1 is generated, the cleaning path generation part 30b generates a dirt detection path such that the detection traveling vehicle 1 does not collide with the cleaning traveling vehicle 2. For example, the cleaning path generation part 30b divides the light receiving surface Sa of the solar panel S into a plurality of sections. Further, the cleaning path generation part 30b may generate a cleaning path and a dirt detection path such that the detection traveling vehicle 1 and the cleaning traveling vehicle 2 do not travel at the same time within the same section. It should be noted that the detection traveling vehicle 1 and the cleaning traveling vehicle 2 can also travel such that they avoid collision with each other by performing transmission and reception of positional information or performing transmission and reception of information such as the presence or absence of approaching therebetween.

[Charging Device]

As illustrated in FIG. 1, the charging device 4 is provided at the charging point P installed on the light receiving surface Sa of the solar panel S. In the present embodiment, the charging points P are respectively provided at a plurality of predetermined positions on the light receiving surface Sa. The charging devices 4 are respectively provided at a plurality of charging points P. The charging device 4 performs transmission of electric power with respect to the detection traveling vehicle 1 and the cleaning traveling vehicle 2. In the present embodiment, the charging device 4 performs transmission of electric power in a non-contact manner with respect to the detection traveling vehicle 1 and the cleaning traveling vehicle 2.

As illustrated in FIG. 6, an electric power distribution box 44 supplies a part of electric power generated by the solar panel S to the charging device 4 and supplies the rest to an electric power transmission device. At this time, the electric power distribution box 44 transforms the voltage and rectifies electric power of the solar panel S such that an electric power transmission battery 43 can be charged. The electric power transmission device transmits electric power generated by the solar panel S to electric power supply destinations such as various facilities using electric power, and an electric power storage device.

The charging device 4 includes the electric power transmission coil part 41, a rectifier 42, and the electric power transmission battery 43. The electric power transmission battery 43 stores electric power supplied from the electric power distribution box 44. Even at a time such as at night when the solar panel S cannot generate electric power, the charging device 4 can supply electric power to the detection traveling vehicle 1 and the cleaning traveling vehicle 2 by using this electric power.

The rectifier 42 supplies electric power of the electric power transmission battery 43 to the electric power transmission coil part 41. At this time, the rectifier 42 transforms the voltage and rectifies electric power of the electric power transmission battery 43 such that electric power can be transmitted by the electric power transmission coil part 41 and further performs processing such as frequency conversion.

The electric power transmission coil part 41 includes an electric power transmission coil for supplying electric power in a non-contact manner to the electric power receiving coil part 13 of the detection traveling vehicle 1 and the electric power receiving coil part 23 of the cleaning traveling vehicle 2. It should be noted that various known methods can be employed as a method for transmitting electric power in a non-contact manner using a coil performed between the electric power transmission coil part 41 and the electric power receiving coil part 13 of the detection traveling vehicle 1 and between the electric power transmission coil part 41 and the electric power receiving coil part 23 of the cleaning traveling vehicle 2.

In the present embodiment, it should be noted that the upper surface of the electric power transmission coil part 41 is at the same height position as the light receiving surface Sa of the solar panel S. Accordingly, the detection traveling vehicle 1 and the cleaning traveling vehicle 2 can reach the charging point P without being caught by the electric power transmission coil part 41.

The charging device 4 supplies electric power in a non-contact manner to the detection traveling vehicle 1 in a state where the detection traveling vehicle 1 arrives at the charging point P and the electric power receiving coil part 13 of the detection traveling vehicle 1 and the electric power transmission coil part 41 face each other. The charging device 4 supplies electric power in a non-contact manner to the cleaning traveling vehicle 2 in a state where the cleaning traveling vehicle 2 arrives at the charging point P and the electric power receiving coil part 23 of the cleaning traveling vehicle 2 and the electric power transmission coil part 41 face each other.

As above, in this solar panel cleaning system 100, in the control device 3, a dirt map is generated on the basis of dirt detection results of the detection traveling vehicle 1, and a cleaning path of the cleaning traveling vehicle 2 is generated on the basis of the dirt map. The cleaning traveling vehicle 2 travels on the light receiving surface Sa of the solar panel S on the basis of the generated cleaning path and performs cleaning. In this manner, the cleaning traveling vehicle 2 can efficiently travel on the light receiving surface Sa and perform cleaning on the basis of the generated cleaning path. As above, the solar panel cleaning system 100 can efficiently clean off dirt on the solar panel S using the cleaning traveling vehicle 2.

It should be noted that the detection traveling vehicle 1 is a traveling vehicle for detecting dirt and includes no cleaning tools such as a cleaning brush and rinse water. For this reason, the detection traveling vehicle 1 can travel by means of a small driving force compared to a case of including cleaning tools. Accordingly, the detection traveling vehicle 1 can travel at a high speed compared to a case of including cleaning tools, and thus dirt on the light receiving surface Sa of the solar panel S can be detected within a short period of time. In this manner, the detection traveling vehicle 1 can detect dirt on the light receiving surface Sa of the solar panel S while keeping down the consumption quantity of electric power of the battery 14. In addition, the cleaning part 21 for performing cleaning is mounted in the cleaning traveling vehicle 2. However, the cleaning traveling vehicle 2 can efficiently travel toward a dirty part on the light receiving surface Sa of the solar panel S by traveling along the cleaning path. Accordingly, the cleaning traveling vehicle 2 can perform traveling for efficient cleaning while keeping down the consumption quantity of electric power of the battery 24 compared to a case where the cleaning traveling vehicle 2 itself performs cleaning while detecting dirt.

The map generation part 30a of the control device 3 detects a dirt degree of dirt on the solar panel S and generates a dirt map including a dirt position and a dirt degree. The cleaning path generation part 30b can generate a cleaning path such that the cleaning traveling vehicle 2 passes through the dirt position of dirt a plurality of times when the dirt degree is higher than the predetermined reference dirt degree. In this case, the cleaning traveling vehicle 2 can pass through a part having a high dirt degree a plurality of times and can more reliably eliminate dirt.

The cleaning path generation part 30b of the control device 3 can generate a traveling speed when the dirt degree of dirt is high such that the speed for when the cleaning traveling vehicle 2 passes through the dirt position of the dirt is reduced compared to when the dirt degree is low. In this case, the cleaning traveling vehicle 2 can travel in a part having a high dirt degree at a low speed and can more reliably eliminate dirt while traveling at a low speed.

The cleaning path generation part 30*b* of the control device 3 can generate a cleaning path including the dirt degree of dirt present on the cleaning path when a cleaning path is generated. In this case, the cleaning traveling vehicle 2 can change the mode of cleaning in accordance with the dirt degree included in the cleaning path. Accordingly, the cleaning traveling vehicle 2 can more reliably eliminate dirt by changing the mode of cleaning in accordance with the dirt degree.

The charging device 4 is provided at the position of the charging point P on the solar panel S. The cleaning path generation part 30*b* generates a cleaning path such that the cleaning traveling vehicle 2 stops by the charging point P before the quantity of electric power in the battery 24 of the cleaning traveling vehicle 2 becomes equal to or smaller than the predetermined quantity. Further, the cleaning traveling vehicle 2 travels along the generated cleaning path and charges the battery 24 at the charging point P. In this case, in the solar panel cleaning system 100, stopping of the cleaning traveling vehicle 2 on the solar panel S due to an insufficient residual quantity of electric power in the battery 24 of the cleaning traveling vehicle 2 can curbed.

Similarly, when a dirt detection path of the detection traveling vehicle 1 is generated, the cleaning path generation part 30*b* generates a dirt detection path such that the detection traveling vehicle 1 stops by the charging point P before the quantity of electric power in the battery 14 of the detection traveling vehicle 1 becomes equal to or smaller than the predetermined quantity. Further, the detection traveling vehicle 1 travels along the generated dirt detection path and charges the battery 14 at the charging point P. In this case, in the solar panel cleaning system 100, stopping of the detection traveling vehicle 1 on the solar panel S due to an insufficient residual quantity of electric power in the battery 14 of the detection traveling vehicle 1 can be curbed.

It should be noted that the cleaning traveling vehicle 2 may clean the upper surface of the electric power transmission coil part 41 of the charging device 4 before arriving at the charging point P and performing charging of the battery 24. In this case, in the solar panel cleaning system 100, poor electric power transmission due to dirt on the upper surface of the electric power transmission coil part 41 can be curbed. For example, a case where electrically conductive dirt is present between the electric power receiving coil parts 13 and 23 and the electric power transmission coil part 41 is conceivable. In this case, since transmission of electric power is performed in a non-contact manner, there is a likelihood that a magnetic field generated between the electric power receiving coil parts 13 and 23 and the electric power transmission coil part 41 will generate an induction current due to electrically conductive dirt and the efficiency of electric power transmission will deteriorate. However, in the solar panel cleaning system 100 according to the present embodiment, since electrically conductive dirt can be eliminated by the cleaning traveling vehicle 2, deterioration in efficiency of electric power transmission can be curbed.

Hereinabove, the embodiment of the present disclosure has been described. However, the present disclosure is not limited to the foregoing embodiment. For example, in the solar panel cleaning system 100 according to the foregoing embodiment, the control device 3 generates a dirt map and generates a cleaning path. However, it is not limited thereto, and the map generation part 30*a* and the cleaning path generation part 30*b* may be provided in the detection traveling vehicle 1 or may be provided in the cleaning traveling vehicle 2. In addition, the map generation part 30*a* may be provided in the detection traveling vehicle 1, and the cleaning path generation part 30*b* may be provided in the cleaning traveling vehicle 2. In this case, communication can be performed between the detection traveling vehicle 1 and the cleaning traveling vehicle 2, and cleaning of the solar panel S can be performed.

When images captured by the camera are included in dirt information acquired from the detection traveling vehicle 1, the map generation part 30*a* may detect the presence or absence of dirt on the basis of change in the captured images. In this case, for example, the map generation part 30*a* may detect the presence or absence of dirt and the position of dirt on the basis of a difference between an image captured when the solar panel S is installed and an image acquired from the detection traveling vehicle 1.

In addition, the cleaning path generation part 30*b* may generate a cleaning path such that the upper surface of the electric power transmission coil part 41 is cleaned by the cleaning traveling vehicle 2 before the detection traveling vehicle 1 performs charging at the charging point P.

In addition, the control device 3 may detect a damaged area of the solar panel S on the basis of detection results of the dirt sensor 11 of the detection traveling vehicle 1 in addition to the presence or absence of dirt on the solar panel S. For example, information of this damaged area may be utilized for maintenance and repair of the solar panel S.

The solar panel cleaning system 100 may perform elimination of snow piled up on the solar panel S instead of dirt on the solar panel S. In this case, the control device 3 detects the presence or absence of snow instead of dirt on the basis of detection results of the dirt sensor 11 of the detection traveling vehicle 1. Further, the control device 3 generates a snow elimination path for eliminating snow on the solar panel S using the cleaning traveling vehicle 2. The cleaning traveling vehicle 2 may travel along the generated snow elimination path and perform elimination of snow.

The map generation part 30*a* of the control device 3 is not limited to generating a dirt map on the basis of dirt information acquired from the detection traveling vehicle 1 traveling on the solar panel S. For example, the control device 3 may acquire a situation of dirt of the solar panel S from a flight vehicle flying above the solar panel S. Further, the map generation part 30*a* of the control device 3 may generate a dirt map on the basis of the dirt situation of the solar panel S acquired from the flight vehicle in addition to the dirt information acquired from the detection traveling vehicle 1.

In addition, electric power transmission may be performed by wire instead of electric power transmission in a non-contact manner between the detection traveling vehicle 1 and the charging device 4 and between the cleaning traveling vehicle 2 and the charging device 4. In this case, the cleaning traveling vehicle 2 may clean a contact point part (electric power transmission portion) of the charging device electrically connected to the detection traveling vehicle 1 and the cleaning traveling vehicle 2 before charging.

In addition, there may be a gap between a plurality of solar panel bodies constituting the solar panel S. In this case, a communication passage through which the detection traveling vehicle 1 and the cleaning traveling vehicle 2 can travel may be provided between the solar panel bodies. Accordingly, the detection traveling vehicle 1 and the cleaning traveling vehicle 2 can come and go between the solar panel bodies via the communication passage even if there is a gap between the solar panel bodies.

It should be noted that the present disclosure can contribute to diffusion and expansion of renewable energy. For this reason, for example, the present disclosure can contribute to Goal 7 "Ensure access to affordable, reliable, sustainable and modern energy for all" and Goal 13 "Take urgent action to combat climatic change and its impact" of Sustainable Development Goals (SDGs).

The invention claimed is:

1. A solar panel cleaning system comprising:
a detection traveling vehicle configured to travel on a solar panel and including one or more sensors configured to detect dirt on the solar panel;
at least one processor configured to:
generate a dirt map including dirt positions of detected dirt on the solar panel on the basis of detection results sensed by the one or more sensors of the detection traveling vehicle; and
generate a cleaning path for performing cleaning of the solar panel on the basis of the generated dirt map; and
a cleaning traveling vehicle configured to travel on the solar panel on the basis of the generated cleaning path and perform cleaning of the solar panel;
wherein the one or more sensors are configured sense a respective dirt degree of detected dirt on the solar panel for each position of detected dirt and the processor is configured to generate the dirt map such that it includes dirt positions and respective dirt degrees for detected dirt on the solar panel, and
wherein the processor is configured to generate the cleaning path such that the cleaning traveling vehicle passes through dirt positions of detected dirt a plurality of times when the respective dirt degree is higher than a predetermined reference dirt degree.

2. A solar panel cleaning system comprising:
a detection traveling vehicle configured to travel on a solar panel and including one or more sensors configured to detect dirt on the solar panel;
at least one processor configured to:
generate a dirt map including dirt positions of detected dirt on the solar panel on the basis of detection results sensed by the one or more sensors of the detection traveling vehicle; and
generate a cleaning path for performing cleaning of the solar panel on the basis of the generated dirt map; and
a cleaning traveling vehicle configured to travel on the solar panel on the basis of the generated cleaning path and perform cleaning of the solar panel;
wherein the solar panel is provided with a charging point having a charging device for charging a battery of the cleaning traveling vehicle installed thereat,
wherein the at least one processor generates the cleaning path such that the cleaning traveling vehicle stops by the charging point before a quantity of electric power in the battery becomes equal to or smaller than a predetermined quantity,
wherein the cleaning traveling vehicle charges the battery at the charging point, and
wherein the cleaning traveling vehicle cleans an electric power transmission portion of the charging device before arriving at the charging point and performing charging of the battery.

3. A cleaning path generation device comprising:
at least one processor configured to generate a cleaning path for performing cleaning by causing a cleaning traveling vehicle to travel on a solar panel on the basis of dirt map including a dirt positions and respective dirt degrees of dirt on the solar panel; and
wherein the at least one processor generates the cleaning path such that the cleaning traveling vehicle passes through a dirt position of the dirt a plurality of times when the respective dirt degree is higher than a predetermined reference dirt degree.

4. The cleaning path generation device according to claim 3,
wherein the solar panel is provided with a charging point having a charging device for charging a battery of the cleaning traveling vehicle installed thereat, and
wherein the at least one processor generates the cleaning path such that the cleaning traveling vehicle stops by the charging point before a quantity of electric power in the battery becomes equal to or smaller than a predetermined quantity.

* * * * *